United States Patent
Zoboli

(10) Patent No.: US 6,616,192 B1
(45) Date of Patent: Sep. 9, 2003

(54) DIELECTRIC PIPE JOINT, PARTICULARLY FOR UNDERGROUND PIPES

(75) Inventor: Valter Zoboli, Via Prampolini, 30, 41043 Formigine (IT)

(73) Assignee: Valter Zoboli (IT)

( * ) Notice: Subject to any disclaimer, the term of this patent is extended or adjusted under 35 U.S.C. 154(b) by 0 days.

(21) Appl. No.: 09/679,293

(22) Filed: Oct. 6, 2000

(30) Foreign Application Priority Data

Oct. 7, 1999 (IT) .......................................... MO99A0213

(51) Int. Cl.⁷ ................................................ F16L 25/02
(52) U.S. Cl. ............................... 285/54; 285/47; 285/53
(58) Field of Search .............................. 285/47, 48, 52, 285/54, 53

(56) References Cited

U.S. PATENT DOCUMENTS

| | | | | |
|---|---|---|---|---|
| 3,441,293 A | * | 4/1969 | Bagnulo | 285/50 |
| 3,612,578 A | * | 10/1971 | Bagnulo | 285/50 |
| 3,860,269 A | * | 1/1975 | Horton et al. | 285/47 |
| 4,411,457 A | * | 10/1983 | Inoue et al. | 285/52 |
| 4,790,570 A | * | 12/1988 | De Gruijter | 285/54 |
| 4,817,993 A | | 4/1989 | Zoboli | |
| 5,275,612 A | * | 1/1994 | Bales, Jr. | 606/205 |

FOREIGN PATENT DOCUMENTS

| | | | | |
|---|---|---|---|---|
| CH | 494 361 | 7/1970 | | |
| GB | 718 530 | 11/1952 | | |
| GB | 1 307 043 | 2/1973 | | |
| GB | 1 559 291 | 1/1980 | | |
| GB | 2084681 | * | 4/1982 | 285/48 |
| GB | 2 196 711 | 5/1988 | | |

* cited by examiner

Primary Examiner—Lynne H. Browne
Assistant Examiner—G. M. Collins
(74) Attorney, Agent, or Firm—Douglas R. Wolf; Wolf, Greenfield & Sacks, P.C.

(57) ABSTRACT

A dielectric joint for pipes, particularly for underground pipes, comprises a male head of a first pipe which enters a mating and mutually opposite cup-shaped female head of a second pipe; a sealing insulating means is interposed between the pipes and is externally extended on the first pipe by an extent which reaches beyond the inlet edge of the female head and internally forms a tight-fitting cladding of the first and second pipes for a longitudinal extent which is at least equal to the overall length of the joint.

13 Claims, 4 Drawing Sheets

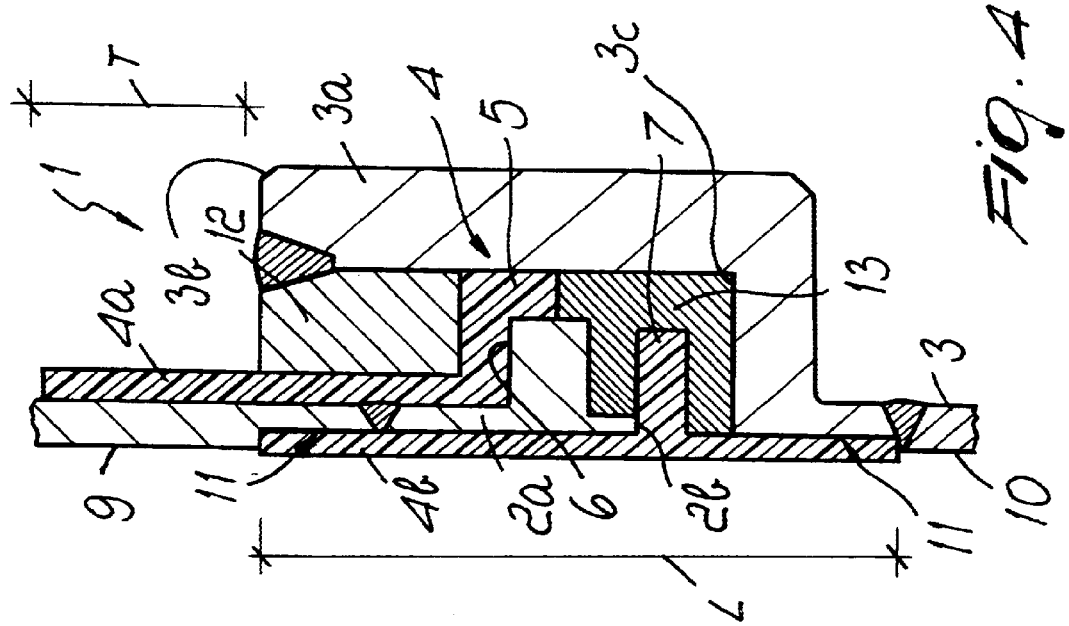
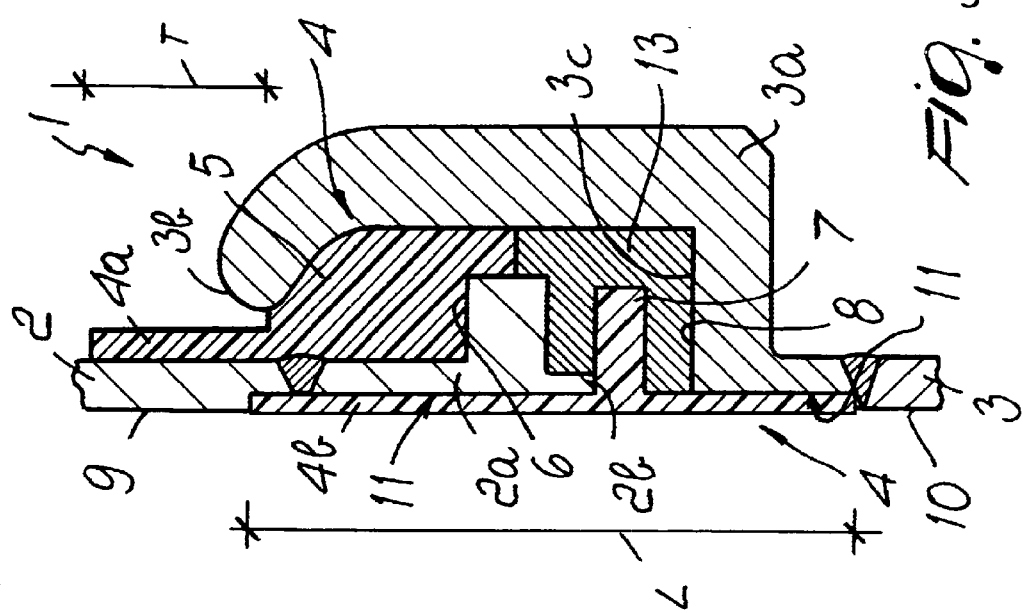

DIELECTRIC PIPE JOINT, PARTICULARLY FOR UNDERGROUND PIPES

CROSS-REFERENCE TO RELATED APPLICATIONS

This application claims priority to Italian Application Serial No. MO99A000213 filed Oct. 7, 1999, the disclosure of which is incorporated herein by reference.

BACKGROUND OF THE INVENTION

The present invention relates to a dielectric pipe joint, particularly for underground pipes.

Several conventional kinds of dielectric joint for mutually joining in a linear fashion pipes are usually made of steel and are designed for being buried and used to convey gas, water and other substances.

These joints are adapted to withstand, over time, the wear produced not only by natural atmospheric agents but also, and most importantly, by so-called stray currents, which are electrical phenomena that are present in the ground and discharge onto the pipes, because they are made of metal, gradually eroding their structural integrity.

Currently, conventional joints are composed of a coupling between a male head of one end of a pipe segment and by a complementary female head which is shaped so as to accommodate the male head.

The male head forms a protruding annular collar which, once inserted in the female head, forms, together with the inner wall of the female head, a receptacle for accommodating a sealing gasket made of elastomeric material, to be interposed between the two heads in order to electrically insulate them.

When the gasket is positioned, the mouth of the complementary female head is folded in an annular fashion onto the pipe with a male head so as to stabilize the coupling and make it monolithic, and any gap remaining between the heads is closed by pouring epoxy resin which sets.

As an alternative, in order to stabilize the coupling, a circular sleeve is welded inside the female head, its height being such that it does not protrude from the head yet can press on the annular collar of the male head, retaining it.

In this case also, a bead of resin is applied in order to close hermetically the resulting joint.

To complete the above-described dielectric coupling, a coat of insulating lacquer is also applied inside the two pipes, particularly in their head regions, so as to eliminate any possible form of electrically active bridge caused by infiltrations and moisture.

However, due to the limited length of the female head and to the proximity between the folded edge of the mouth of the head or of the circular sleeve and the outer surface of the male pipe, or due to imperfect application of the sealing bead of resin and of the internal coating of the pipes, electrical transmission between said heads and therefore between the pipes often persists.

Moreover, the mechanical stresses generated in the soil tend to break up the monolithic nature of the joints, compressing and sometimes damaging the separation gaskets until the metallic portions of the two mating pipes make mutual direct contact, further worsening the damaging flow of electricity.

SUMMARY OF THE INVENTION

The aim of the present invention is to solve the above-mentioned problems of the prior art, by providing a dielectric joint for pipes, particularly for underground pipes, which radically eliminates the defects of the prior art, ensuring complete insulation from stray currents over time and even in case of significant mechanical stresses.

This aim and other objects which will become better apparent hereinafter are achieved by a dielectric joint for pipes, particularly for underground pipes, which comprises a male head of a first pipe which enters a mating and mutually opposite cup-shaped female head of a second pipe, a sealing insulating means being interposed between said pipes, characterized in that said sealing insulating means is externally extended on said first pipe by an extent which reaches beyond the inlet edge of said female head and internally forms a tight-fitting cladding of said first and second pipes for a longitudinal extent which is at least equal to the overall length of the joint.

BRIEF DESCRIPTION OF THE DRAWINGS

Further characteristics and advantages of the present invention will become better apparent from the following detailed description of a preferred embodiment of a dielectric joint for pipes, particularly for underground pipes, illustrated only by way of non-limitative example in the accompanying drawings, wherein:

FIGS. 1 to 8 are partial sectional views, taken along a longitudinal plane, of the dielectric joint according to the invention, executed according to four possible embodiments and in the interpenetrating configuration of the heads.

DESCRIPTION OF THE PREFERRED EMBODIMENTS

Figure 1:
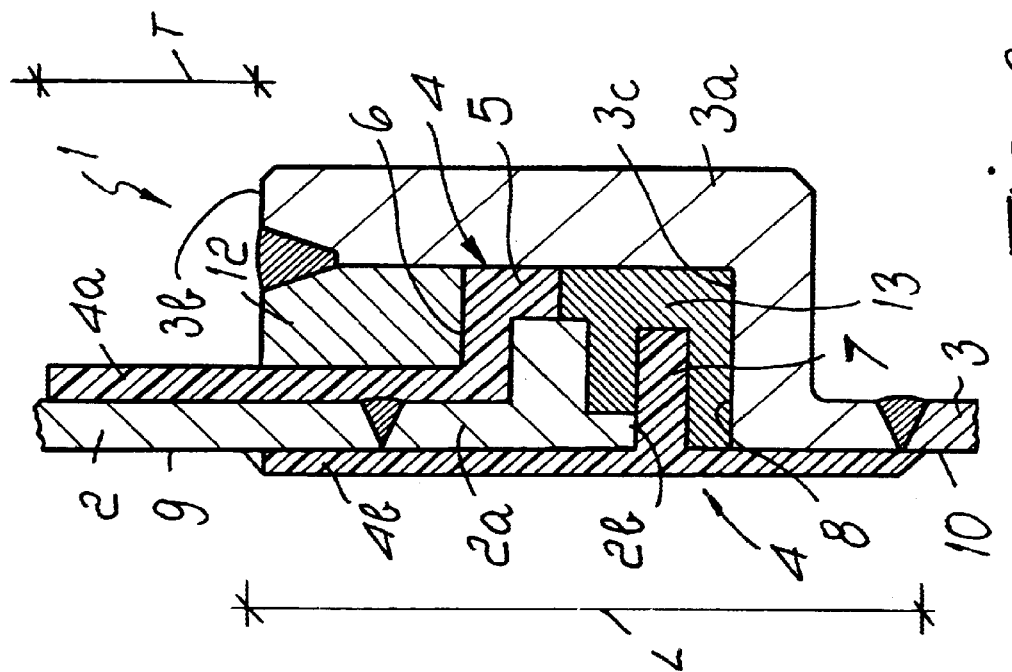

With reference to the figures, 1 designates a dielectric joint for pipes, particularly for underground pipes, which is usually composed of a male head 2a of a first pipe 2 which enters a mating and mutually opposite cup-shaped female head 3a of a second pipe 3; a sealing insulating means 4 is interposed between said heads.

In the preferred embodiment, the insulating means is divided into two parts: a first one 4a, which is interposed between said heads 2a and 3a, and a second one 4b, which is accommodated inside the pipes 2 and 3, substantially in the region where they join.

The first part 4a is substantially cylindrical and forms, at one end, a protruding edge 5 whose cross-section duplicates the cross-section of a corresponding hollow seat 6 which remains between the heads 2a and 3a when they mutually interpenetrate so as to form the joint 1.

The opposite end is fitted externally over the outer surface of the first pipe 2 and extends on it by an extent "T" which reaches beyond the inlet edge 3b of the female head 3a.

The second part 4b also has a cylindrical shape and adheres to the inner walls of the pipes 2 and 3 so as to clad them; its longitudinal extension "L" is at least equal to the overall length of the joint 1.

The second part 4b of said insulating means 4 also is peripherally provided with a ring 7 which protrudes radially outwards and can be snugly inserted in a corresponding hollow seat 8 formed perimetrically between the end edge 2b of the male head 2a and the bottom shoulder 3c of the female head 3a in the interpenetrating configuration.

The second part 4b can further be inserted in an annular seat 11 so as to substantially fit entirely therein; in a further possible embodiment of the joint 1, the seat is recessed to size in the internal surfaces 9 and 10 of the first pipe 2 and the second pipe 3.

An additional gasket 13 for maintaining the continuity of the hydraulic and dielectric seal and of the seal against any pressure inside the pipes 2 and 3 is accommodated between the first part 4a and the second part 4b.

The invention is produced in the factory, i.e. before use, as follows: the male head 2a, provided beforehand with the first part 4a of the sealing insulating means 4, is inserted in the cup-shaped female head 3a.

Figure 2:
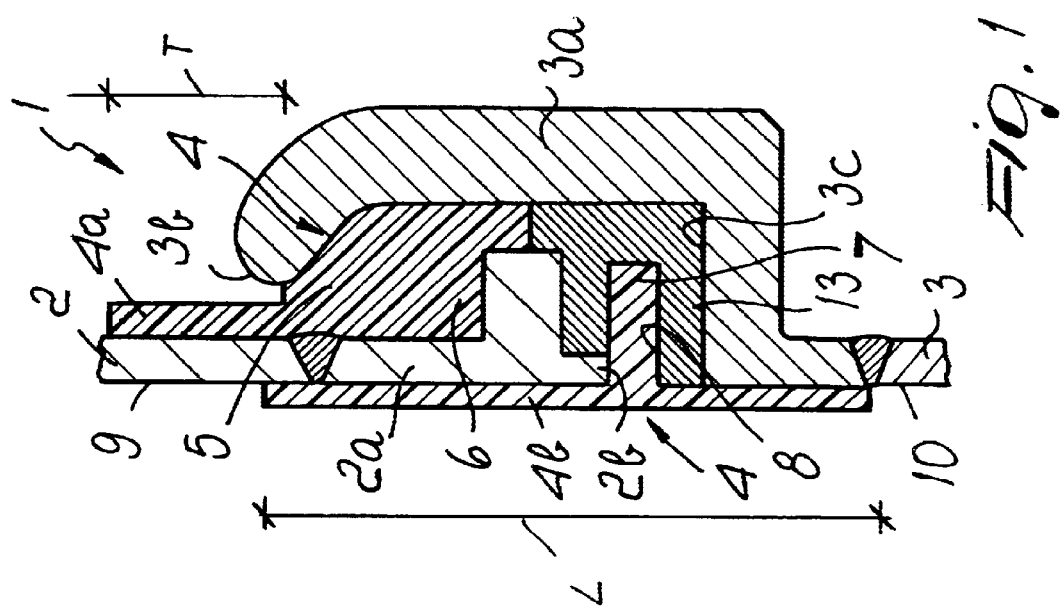
Figure 5:
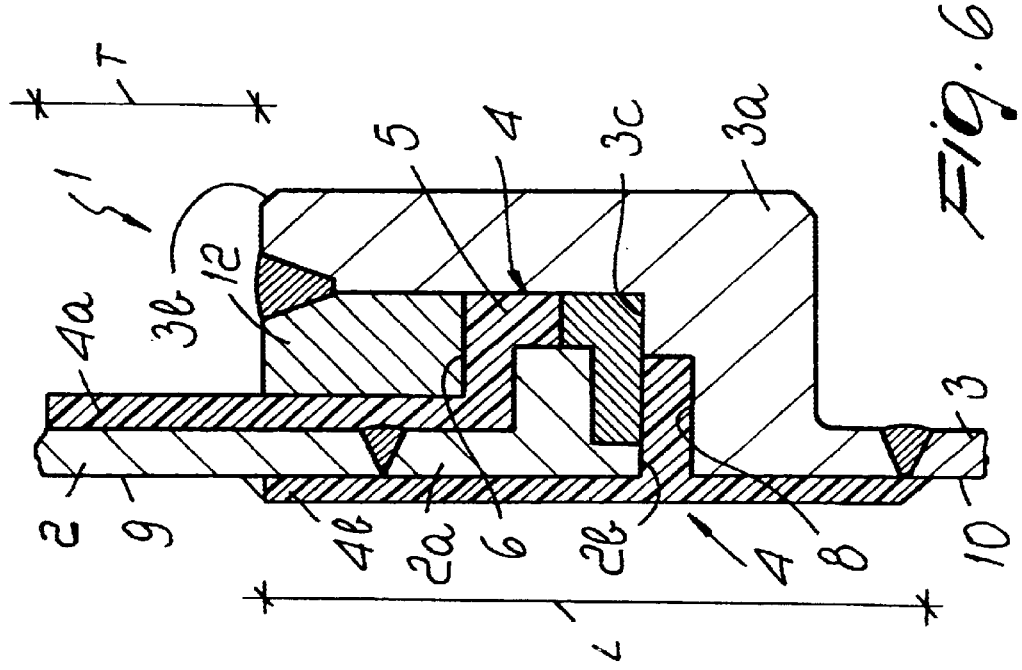
Figure 6:
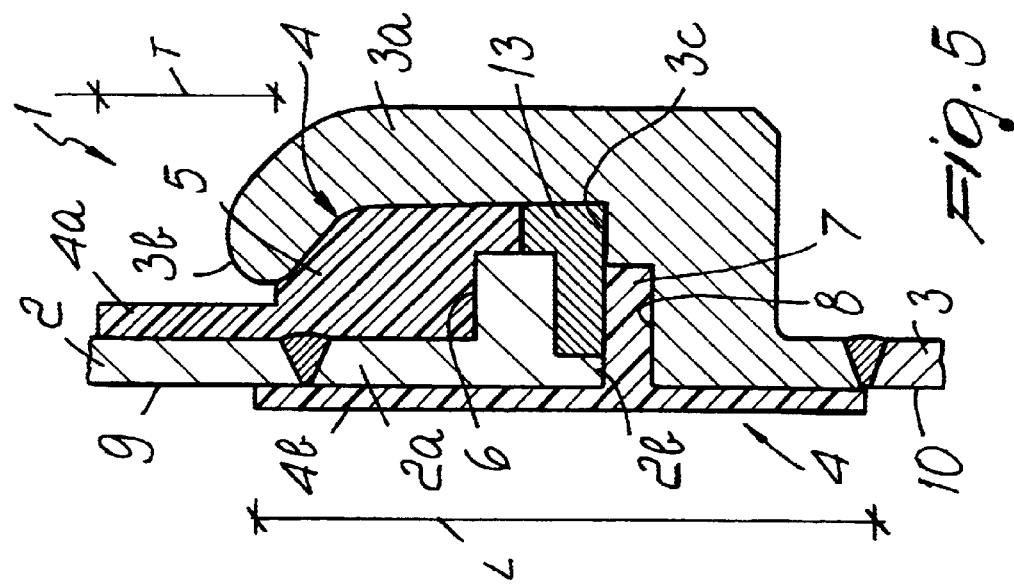
Figure 7:
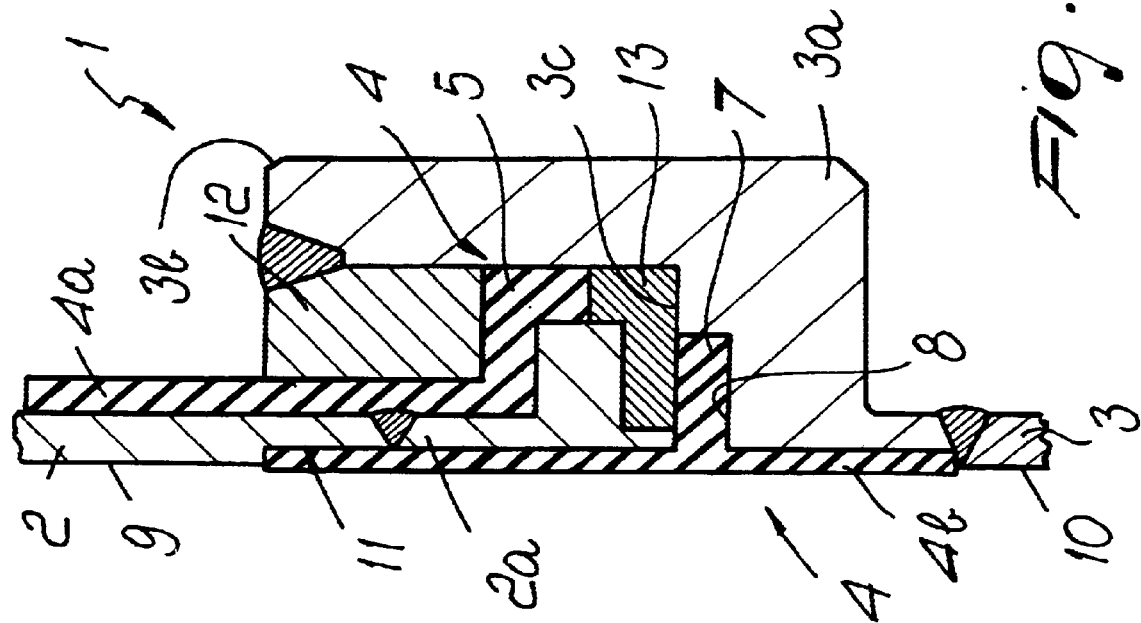
Figure 8:
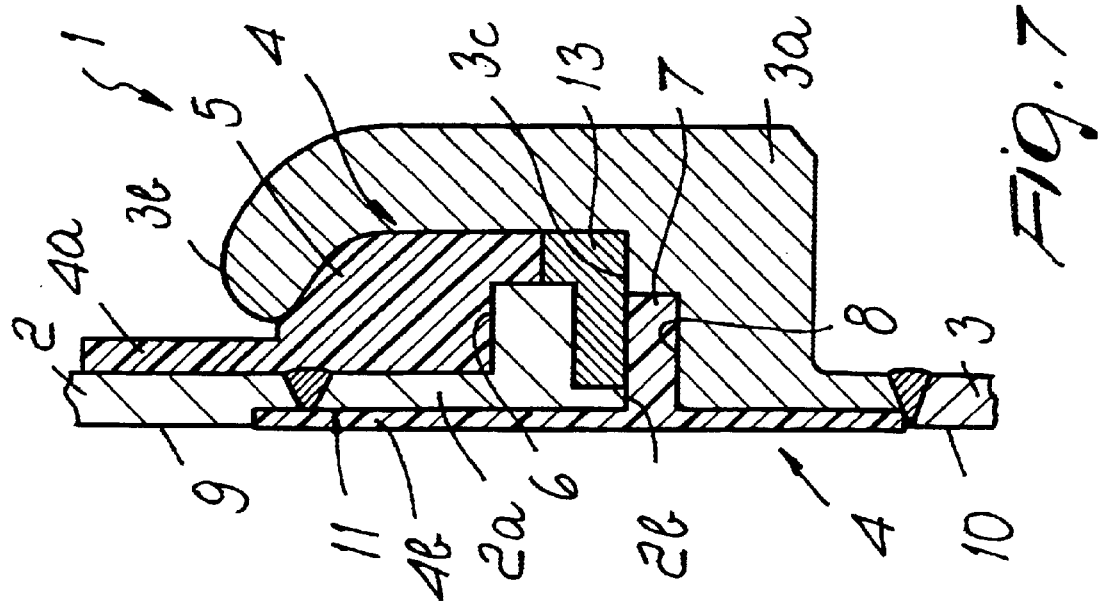

The shape of the cross-section of the sealing insulating means varies according to the type of coupling performed, which is in any case known: FIGS. 1 and 3 illustrate a coupling provided by folding the edge 3b of the head 3a onto the first pipe 2, while FIGS. 2 and 4 illustrate the coupling provided by thermal bonding of a ring 12 which lies inside said cup-shaped female head 3a.

In both cases, the edges 5 have cross-sections which snugly adapt to the hollow seats 6 formed between the interpenetrating heads 2a and 3a and opposite ends which in any case protrude by the extent "T" beyond the edge 3b: this allows to eliminate any possible form of electric bridge between said edge 3b and the outer surface of the first pipe 2 and to also eliminate the necessity to provide a filling bead of sealing material.

The gasket 13 and the second part 4b of the sealing insulating means 4 are positioned in the female head 3a before the male head 2a is inserted in the female head. The ring 7 remains clamped in the seat 8 when the insertion of the male head 2a is completed, and the length "L" of said second part 4b protects from the inside both pipes 2 and 3, in turn eliminating any possible form of electric bridge generated between them by moisture or by the highly conductive fluids (for example water) that flow inside them and maintaining unchanged over time its insulation characteristics.

If required, the second part 4b can be fully accommodated inside the seat 11 formed in the inner surfaces 9 and 10 of the pipes 2 and 3.

The heads 2a and 3a are then rigidly coupled on-site, by means of conventional welding beads, to the respective pipes 2 and 3, which are usually of the so-called medium- or high-pressure type, thus completing their jointing without risk of damage due to stray currents.

It is noted that the lengths of the portions T and L can be changed according to the total voltage that the joint 1 is to withstand in each instance or, viceversa, to the absolute resistance value to be achieved: in practice, by increasing the value of said lengths joints 1 are produced which are proportionally more resistant to high voltages.

In practice it has been observed that the above-described invention achieves the intended aim and objects.

The invention thus conceived is susceptible of numerous modifications and variations, all of which are within the scope of the inventive concept.

All the details may further be replaced with other technically equivalent ones.

In practice, the materials employed, as well as the shapes and the dimensions, may be any according to requirements without thereby abandoning the scope of the protection of the appended claims.

The disclosures in Italian Patent Application No. MO99A000213 from which this application claims priority are incorporated herein by reference.

What is claimed is:

1. A dielectric joint for pipes, particularly for underground pipes, comprising a male head of a first pipe which enters a mating and mutually opposite cup-shaped female head of a second pipe, a sealing insulating means being interposed between said pipes, wherein said sealing insulating means is composed of at least a first and a second independent parts, each of which first and second parts being integral, wherein said sealing insulating means is externally extended on said first pipe by an extent which reaches beyond an inlet edge of said female head in an axial direction and internally forms a tight-fitting cladding of said first and second pipes for a longitudinal extent which is at least equal to the overall length of the joint.

2. The joint according to claim 1, wherein said first part is arrangeable between the respective outer and inner surfaces of said heads and fitting on the outer surface of said first pipe, extending beyond said inlet edge of the female head and said second part acts as tight-fitting inner cladding of said first and second pipes.

3. The joint according to claim 2, wherein said first part of said insulating sealing means perimetrically forms a contoured annular edge for snug adaptation of a corresponding complementarily shaped hollow seat formed between said male and female heads.

4. The joint according to claim 2, wherein said second part of said sealing insulating means is peripherally provided with a ring which protrudes radially and externally and can be snugly inserted in a corresponding hollow seat formed between an end edge of said male head and the bottom shoulder of said female head.

5. The joint according to claim 2, wherein at least one elastomeric gasket is inserted between said first and second parts of said sealing insulating means in order to maintain the continuity of the seal.

6. The joint according to claim 2, wherein said first and second parts of said sealing insulating means are made of polycarbonate.

7. The joint according to claims 2, 4, or 6, wherein said second part of said sealing insulating means is inserted substantially fully in an annular seat which is provided to size in the internal surfaces of said first and second pipes.

8. A dielectric joint for pipes, particularly for underground pipes, comprising a male head of a first pipe which enters a mating and mutually opposite cup-shaped female head of a second pipe, a sealing insulating means being interposed between said pipes, wherein said sealing insulating means is composed of at least a first and a second independent parts, at least one elastomeric gasket being inserted between said first and second parts in order to maintain the continuity of the seal, and wherein said sealing insulating means is externally extended in an axial direction on said first pipe by an extent which reaches beyond an inlet edge of said female head and internally forms a tight-fitting cladding of said first and second pipes for a longitudinal extent which is at least equal to the overall length of the joint.

9. The joint according to claim 8, wherein said first part is arrangeable between the respective outer and inner surfaces of said heads and fitting on the outer surface of said first pipe, extending beyond said inlet edge of the female head and said second part acts as tight-fitting inner cladding of said first and second pipes.

10. The joint according to claim 9, wherein said first part of said insulating scaling means perimetrically forms a contoured annular edge for snug adaptation of a corresponding complementarily shaped hollow seat formed between said male and female heads.

11. The joint according to claim 9, wherein said second part of said scaling insulating means is peripherally provided with a ring which protrudes radially and externally and can be snugly inserted in a corresponding hollow seat formed between an end edge of said male head and the bottom shoulder of said female head.

12. The joint according to claim 9, wherein said first and second parts of said sealing insulating means are made of polycarbonate.

13. The joint according to claim 9, wherein said second part of said sealing insulating means is inserted substantially fully in an annular seat which is provided to size in the internal surfaces of said first and second pipes.

* * * * *